United States Patent [19]

Sakagami

[11] 3,797,027
[45] Mar. 12, 1974

[54] DEVICE FOR ADVANCING FILM IN A CAMERA

[75] Inventor: Norio Sakagami, Tokyo, Japan

[73] Assignee: Olympus Optical Company, Ltd., Tokyo, Japan

[22] Filed: Nov. 5, 1971

[21] Appl. No.: 196,065

[30] Foreign Application Priority Data
Nov. 11, 1970 Japan.................. 45-99286

[52] U.S. Cl.................... 354/203, 354/213, 354/215
[51] Int. Cl. ............................................. G03b 19/04
[58] Field of Search........................... 95/12.5, 31

[56] References Cited
UNITED STATES PATENTS
2,283,788   5/1942   Briechle.......................... 95/12.5

Primary Examiner—John M. Horan
Attorney, Agent, or Firm—Toren and McGeady

[57] ABSTRACT

A device for advancing non-perforated film in roll form from a supply spool to a take-up spool in a film holder attached to a camera includes a film winding lever secured to the camera which is operatively connected to film advancing members by a gear arrangement. As the film is advanced, the angular rotation of a guide roller for the film is detected so that the film can be moved forwardly a specific amount for each exposure. Further, as the film is rolled onto the take-up spool the rotation of the guide roller is used for operating a film frame member indicating dial for providing a visible indication of the number of exposures made.

4 Claims, 9 Drawing Figures

PATENTED MAR 12 1974 3,797,027

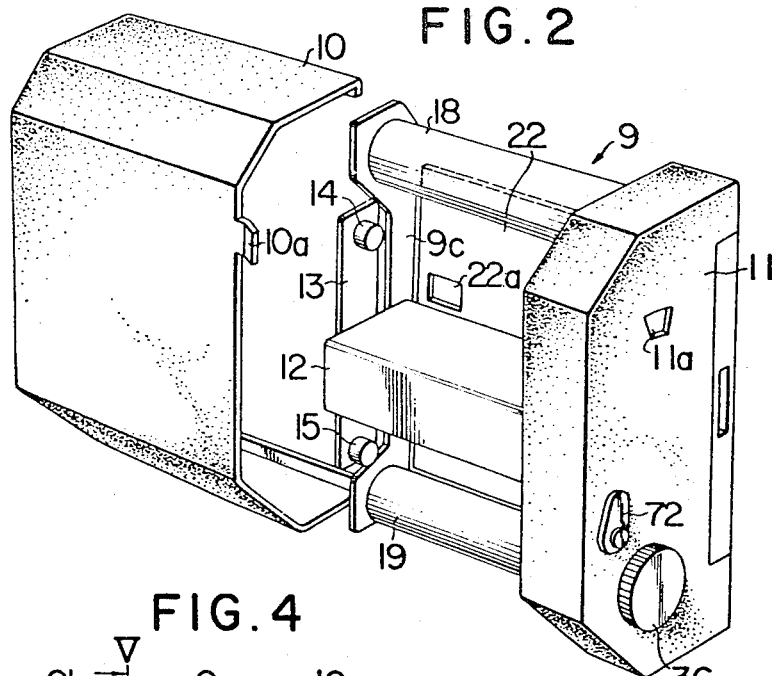
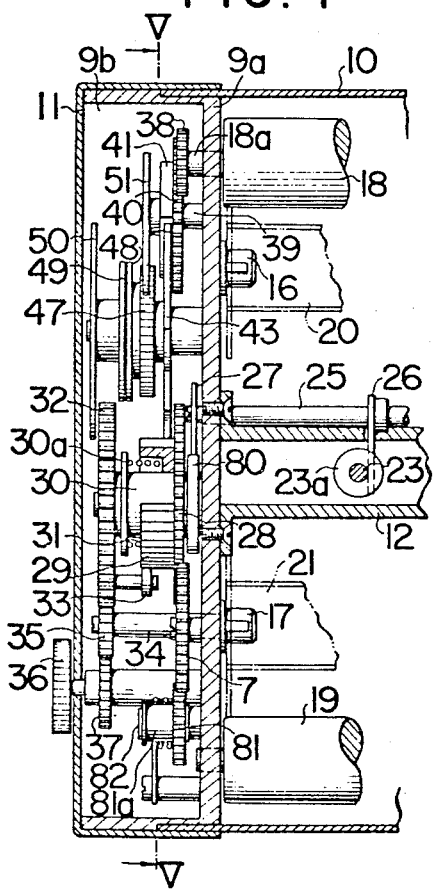
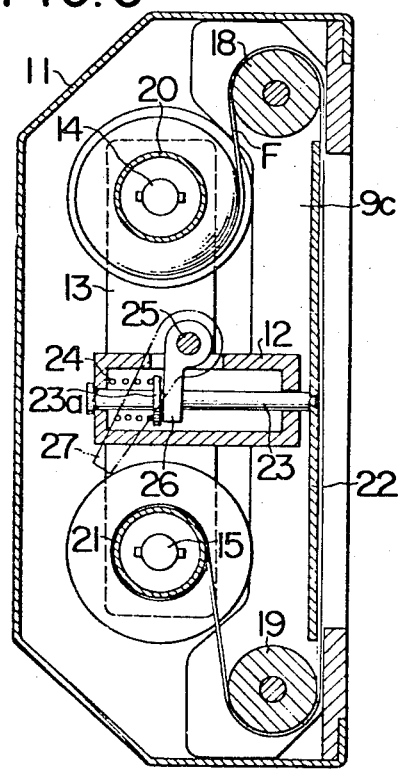

3,797,027

DEVICE FOR ADVANCING FILM IN A CAMERA

BACKGROUND OF THE INVENTION

This invention relates to a device for advancing film in cameras which use non-perforated film of the Brownie format in roll form for producing pictures of various sizes, for instance, 6 × 9, 6 × 7 or 6 × 6.

In the past, it has been customary to advance film in cameras using non-perforated roll film by means of an index plate for successively decreasing the angle of rotation of the film take-up shaft to advance the film a predetermined distance. However, some disadvantages are associated with such conventional film advancing devices, for instance, the construction involved is complex and its production is made difficult when such devices are intended for use in cameras for which two types of non-perforated roll film are available. One such type of film is J120 film which is provided with a backing sheet for its entire length and another is a J220 film which has a light intercepting sheet attached only to its leading end portion and trailing end portion, while for its major portion the backing sheet is omitted so that substantially twice the length of J220 film can be wound in roll form of substantially the same diameter as a roll of J120 film.

SUMMARY OF THE INVENTION

Therefore, the object of this invention is to provide a device for regulating the advance of film in roll form which includes guide rollers arranged to rotate in relation to film advance, with the rotation of a shaft supporting one of the guide rollers through a predetermined angle being detected and the film advance being interrupted so that the film can be moved a predetermined distance for each film frame exposed.

Another object of the present invention is to rotate a film frame indicating dial in relation to the rotation of one of the guide rollers.

In accordance with the present invention, the device for advancing film includes guide rollers which permit a camera to use both J120 film and J220 film without any alteration in the mechanism. The advance of one frame of the film for each exposure is correctly regulated by a disk which is operatively associated with one of the guide rollers to rotate through a predetermined angle. This eliminates the indexing plate used in the past with conventional roll film advance devices and simplifies the mechanism for advancing film.

A gear and a ratchet wheel are maintained in frictional engagement, so that rotation of film transport gearing as a result of an increase in the diameter of the film wound on the take up spool, as the film winding lever is operated through a predetermined angle, can be removed from the power transmission system.

In the present invention, a pressing plate, which holds the film in position, is released from engagement with the film as it is advanced so that the film winding lever can be operated with a low force in advancing the film smoothly.

The various features of novelty which charcterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 2 is a perspective view of the film advancing device of this invention, shown with cover plate removed;

FIG. 3 is a vertical sectional view, on an enlarged scale taken centrally of the film advancing device of FIG. 2;

FIG. 4 is a sectional side view of the film advancing device;

DESCRIPTION OF A PREFERRED EMBODIMENT

Figure 1:
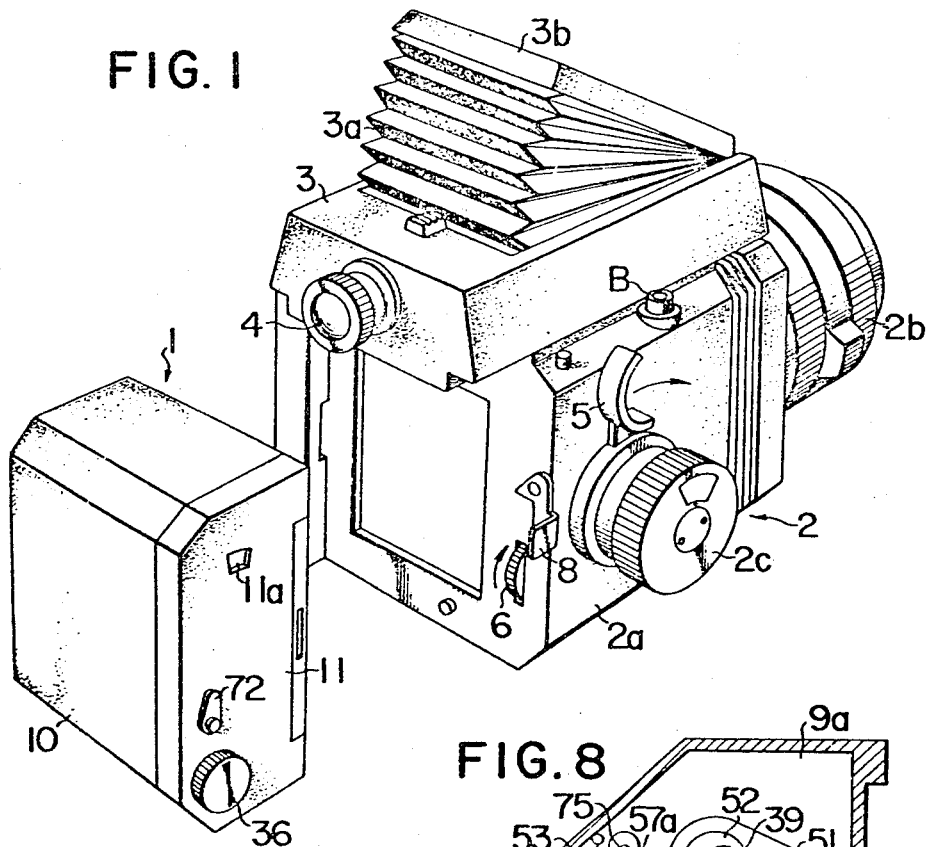
FIG. 1 is a perspective view of a single-lens reflex camera incorporating a device according to the present invention for advancing film.

The film advancing device, according to this invention, is mounted in a film holder 1 which can be detachably mounted on the rear side of a camera 2, as shown in FIG. 1. Camera 2 is a single-lens reflex camera having a camera body 2a in which a taking lens 2b is interchangeably mounted. Taking lens 2b can be moved back and forth along its optical axis through the agency of a rack and pinion arrangement (not shown) to effect focusing when a knob 2c is operated. A case 3 having a built-in finder optical system is detachably mounted on the upper side of camera body 2a. The finder optical system is brought to an operative position in a dark chamber defined by case 3 and a cover 3b which can be moved between a horizontal position and an inclined position due to a bellows 3a connected to the case and the cover.

An eyepiece 4 is mounted on the rear end surface of the case 3 so that en erect image of the subject can be seen through eyepiece 4. A film winding lever 5 is pivotally mounted on shaft mounting knob 2c which is attached to one side of the camera body 2a. Pivoting of film winding lever 5 in the direction of the arrow shown in FIG. 1 causes a gear 6 mounted within and partly exposed on the rear side of camera body 2a to rotate in the direction of the arrow shown alongside it. Gear 6 is placed in meshed engagement with a connection gear 7, note FIG. 5, of the roll film feed device in film holder 1 when the holder is positioned on the rear side of camera body 2a. Film holder 1 is fixed in a lighttight manner on the rear side of camera body by a locking lever 8.

Film holder 1, as shown in FIG. 2, consists of a holder for removably mounting a film supply spool 20 on which a roll of film is supported and a take-up spool 21 onto which the film is wound, a cover 10 providing a lighttight enclosure for the film contained in holder 9, a film advancing device positioned in a section 9b shown in FIG. 4, and a light intercepting plate (not shown) for providing a lighttight cover over the exposing surface of the holder when it is detached from the camera body 2a. Section 9b which houses the film advancing device, is covered with a styled cover 11.

A support 12 of rectangular box shape is disposed in a central portion of the holder 9 and is positioned at right angles to side wall 9a to which it is affixed. The opposite side wall 9c, to which the support 12 is secured, is cut out in its central portion. A plate spring 13 is secured to the central portion of support 12 and is positioned in the cutout portion of side wall 9c. Pins 14 and 15, for supporting the ends of the supply spool and take-up spool, respectively, are secured to upper and lower end portions of plate spring 13 and extend toward side wall 9a.

Additionally, the supply spool and take-up spool are rotatab supported by pins 16 and 17, shown in FIG. 4, which are located on the side wall 9a.

In the holder 9, guide rollers 18 and 19 are disposed above and below the support 12 and are rotatably connected to side walls 9a and 9c at their opposite ends. Guide rollers 18 and 19 guide the movement of a film F between a film supply roll 20 supported by pins 14 and 16 and a film take-up spool 21 supported by pins 16 and 17, as shown in FIG. 3. That is, the film F removed from the supply spool 20 is directed by the upper guide roller 18 toward the lower guide roller 19 which then directs the film toward the take-up spool 21 onto which it is wound. The portion of the film disposed between two rollers 18 and 19 is in position to be exposed.

A pressing plate 22 is disposed in the holder 9 for engagement with the rear side of the length of the film located between guide rollers 18 and 19. The pressing plate 22 is supported by a holding bar 23 which extends through support 12 at right angles to the pressing plate. The holding bar is biased by an expansion coil spring 24 mounted between a flange 23a attached to the bar 23 and the support 12, for urging the pressing plate 22 against the film.

Figure 8:
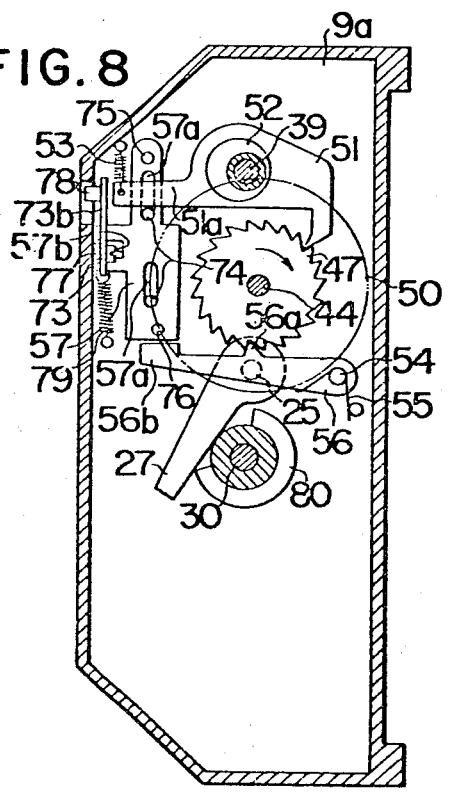
FIG. 8 is a view, partly in section, of the operating means for the exposed film frame number counting mehanism of FIG. 6.

Holding bar 23 functions to release the pressing plate 22 from engagement with the film when the film is advanced. More specifically, when an arm 26, secured to a shaft 25 and extending through side wall 9a, pushes and moves flange 23a against the biasing force of spring 24, holding bar 23 effects the release of the pressing plate 22 from engagement with the film. An arm 27 mounted on the shaft 25, in spaced relationship to the arm 26, rotates the shaft, as shown in FIG. 4 and FIG. 8 and which will be described later.

Figure 5:
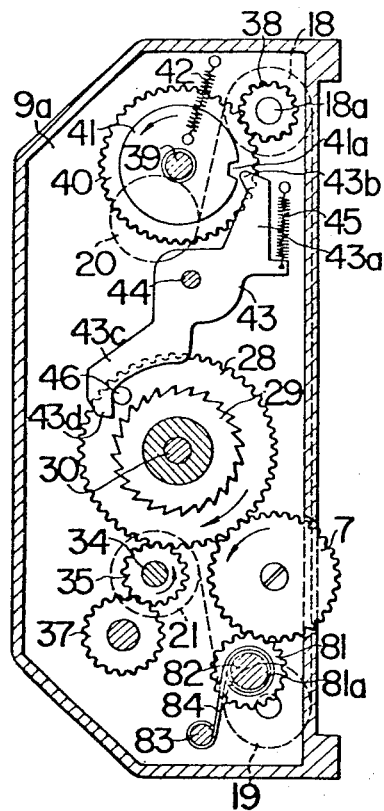
FIG. 5 is a sectional view taken along the line V—V of FIG. 4.

The connection gear 7, operatively connected to film winding lever 5, is shown in FIG. 4 and FIG. 5 in meshed engagement with a large diameter gear 28 located in section 9b. A ratchet wheel 29, mounted coaxially with gear 28, has its ratchet disposed outwardly from the gear 28. The ratchet wheel 29 is maintained in frictional engagement with the gear 28 by a coil spring 31 mounted between ratchet wheel 29 and a flange 30a secured to a shaft 30 on which both the gear 28 and wheel 29 are mounted.

A gear 32 of the same diameter as gear 28 is rotatably mounted on shaft 30 on the opposite side of flange 30a from gear 28. Gear 32 carries a locking pawl 33, shown in FIG. 6, which is adapted to engage ratchet wheel 29. When connecting gear 7 rotates, gear 28 meshed with gear 7 also rotates. Rotation of gear 28 causes ratchet wheel 29, maintained in frictional engagement with gear 28, to rotate, and the rotation of the ratchet wheel through locking pawl 33 rotates gear 32 in the same direction as gear 28.

Pin 17, supporting the take-up spool 21 is connected to one end of a shaft 34 which is rotatably supported by one side wall 9a as shown in FIG. 4. The other end of shaft 34 extends into section 9b and mounts a gear 35 arranged in meshed engagement with gear 32. When the film winding lever 5 is operated, it rotates gears 28 and 32 clockwise in FIG. 5 and FIG. 6, and gear 35 rotates counter clockwise and causes, through pin 17, the film take-up spool 21 to rotate counter clockwise in FIG. 3, thereby winding the film.

A gear 37 rotates when a film winding knob 36 mounted on the exterior of the film holder 1 is operated and is in meshed engagement with gear 35. By means of gear 37 a leading end portion of the film is wound when the film is loaded in film holder 1, and a trailing end portion of the film is wound when all the film has been exposed. When film winding knob 36 is turned, gear 35 is driven by gear 37 and rotates the take-up spool 21. During this operation the gear 32 rotates idly as it is rotated by gear 35. When film holder 1 is loaded with a roll of film and the leading end portion of the film is wound as knob 36 is operated, one has only to rotate knob 36 till the starting mark of the film can be seen through a window 22a formed in pressing plate 22 as shown in FIG. 2.

Rotatably supporting the upper guide roller 18 is a shaft 18a which extends through side wall 9a into section 9b, and supports at its end a gear 38 disposed in meshed engagement with a gear 40 rotatably supported by a shaft 39 connected to the side wall 9a. Mounted on shaft 39 is a disk 41 which rotates as a unit with gear 40. The disk 41 is formed on its circumferential periphery with a cutout 41a as shown in FIG. 5, and the cutout 41a is normally maintained in a predetermined stationary position by the biasing force of a spring 42 mounted between disk 41 and an immovable member (not shown).

A locking member 43 includes an arm 43a containing a pawl 43b which is arranged to engage the cutout 41a when disk 41 makes one complete revolution. That is, locking member 43 is pivotally supported by a shaft 44 connected to one side wall 9a and urged by the biasing force of a spring 45 to pivot counter clockwise about shaft 44. Pivotal movement of locking member 43 is precluded by its other arm 43c, which extends in the vicinity of ratchet wheel 29, abutting against a pin 46 attached to the gear 28. Formed at the end of the other arm 43c is a locking pawl 43d which is brought into engagement with ratchet wheel 29 when the pawl 43b at the end of arm 43a of the locking member 43 drops into the cutout 41a of disk 41, thereby terminating rotation of ratchet wheel 29.

Figure 6:
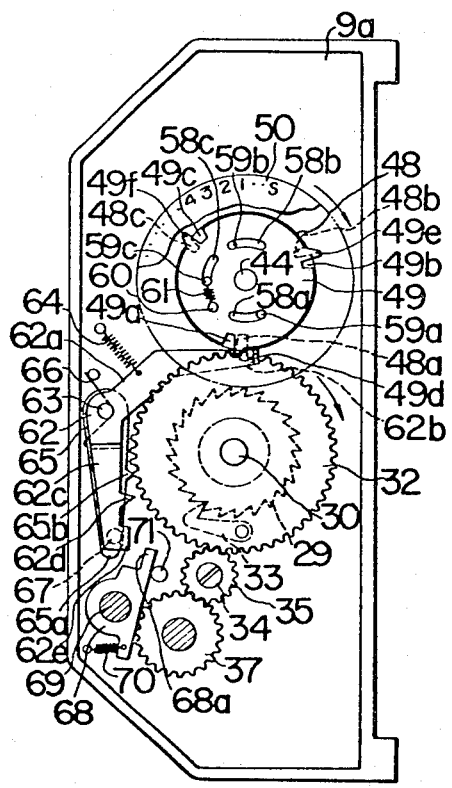
FIG. 6 is a plan view of the exposed film frame counting mechanism.
Figure 7:
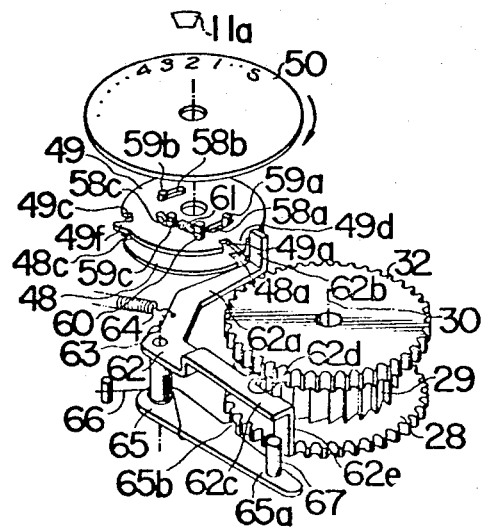
FIG. 7 is a partly exploded, partial perspective view of the arrangement in FIG. 6.

A film frame number counting mechanism is provided on shaft 44 and comprises, as shown in FIG. 6 to FIG. 8, a ratchet wheel 47 rotatably mounted on shaft 44, a disk 48 which rotates as a unit with ratchet wheel 47, a disk 49 of the same diameter as disk 48, a film frame number indication dial 50, a feed pawl 51, a reverse rotation check pawl 56a for ratchet wheel 47, and a spring (not shown) for restoring film frame number indication dial 50 to its original or starting position.

The feed pawl 51 is loosely fitted to an eccentric disk 52 which is fitted on shaft 39 and rotates with the disk 41, shown in FIG. 5 as a unit. Feed pawl 51 is biased by a spring 53 to pivot clockwise about shaft 39. Accordingly, pawl 51 is maintaned in engagement with a serrated portion of ratchet wheel 47 and rotates ratchet wheel 47 a distance corresponding to one tooth thereof when the eccentric disk 52 makes one complete revolution.

On an arm 56 which is pivotally mounted at its base on a shaft 54 and urged by a spring 55 to pivot clockwise about the shaft 54, a reverse rotation check pawl 56a is formed and maintained in engagement with the ratchet wheel 47. A free end portion 56b of arm 56 and an arm 51a extending from feed pawl 51 are adapted to be pushed and moved by a slide plate 57 which will be described later. When slide plate 57 moves, pawls 51 and 56a are released from engagement with ratchet wheel 47.

The disks 48 and 49 are connected to each other by pins, slots and a spring, and cutouts 48a, 48b and 48c and 49a, 49b and 49c are formed in outer peripheral edges of the disks 48 and 49, respectively, in positions substantially equidistantly spaced apart from one another along the disk peripheries. Upper disk 49 is formed with projections 49d, 49e and 49f extending radially outwardly from the circumferential periphery thereof in positions contiguous with those of cutouts 49a, 49b and 49c.

Of projections 49d, 49e and 49f, projection 49d is arranged to engage a locking lever 62, as described later herein, when film frame number indication dial 50 is moved to a film frame number count starting position to indicate a start indication mark S in conjunction with the winding of the leading end portion of the film. Projection 49e is arranged to engage the locking lever when the film frame number indication dial 50 is moved to indicate the number of exposed frames of J120 type film or 8th frame, for example, in conjunction with the winding of the film each time it is exposed. Projection 49f is arranged to engage the locking lever when film frame number indication dial 50 coupled to the winding of the film each time it is exposed indicates the number of exposed frames of J220 type film or 16th frame, for example.

Arcuate slots 58a, 58b and 58c are formed in the upper disk 49 for receiving upright pins 59a, 59b and 59c, respectively, which are attached to the upper surface of the lower disk 48. An upright pin 60 is attached to the upper surface of upper disk 49 in a position between slots 58c and 58a, and a compression spring 61 is mounted between pin 60 and pin 59c received in slot 58c. Accordingly, upper disk 49 is normally urged by the biasing force of spring 61 to move in advance of lower disk 48 within limits determined by slots 58a to 58c when the two disks rotate.

The limits on the advance movement of disk 49 relative to lower disk 48 are such that the distance the former moves ahead of the latter is substantially equal to the width of the cutouts so that the cutouts 49a to 49c of upper disk 49 may not overlap the cutouts 48a to 48c of lower disk 48 respectively. Accordingly, when upper disk 49 moves ahead of lower disk 48 during rotation, the cutouts of two disks are covered by the marginal portions of the other disk so that the two disks appear as a composite complete disk having no cutouts in its edges when viewed from above or below. The locking lever 62 is adapted to engage the outer periphery of the composite complete disk formed in this way.

More specifically, locking lever 62 which has the shape of a bellcrank, note FIG. 6 and FIG. 7, is fulcrumed intermediate its ends on a shaft 63 attached to side wall 9a and one of its arms 62a has an upwardly bent member 62b at its end. The other arm 62c of locking lever 62 extends into the vicinity of gear 32 and at an intermediate point it has a pawl 62d which is adapted to engage gear 32 to stop its rotation, when required. Further, arm 62c is formed at a side edge of its forward end portion with a downwardly bent member 62e. Locking lever 62 is normally urged by a spring 64 to pivot counter clockwise about shaft 63. However, pivotal movement of locking lever 62 is precluded by bent member 62b abutting against the outer peripheries of disks 48 and 49.

Disposed below the arm 62c of the locking lever is a locking arm 65 which is pivotally mounted at its base on shaft 63 and is provided with a pawl 65b at a substantially intermediate portion of its free end portion 65a extending to a position in the vicinity of gear 28. The pawl 65b is arranged to engage gear 28 when required to prevent the rotation of gear 28.

Locking arm 65 is biased by a spring 66 to pivot counter clockwise about shaft 63. The pivotal movement of arm 65 is precluded by a pin 67 attached to the free end portion of arm 65 abutting against downwardly directed bent portion 62e of locking lever 62.

Downwardly bent member 62e is intended to be pushed and moved otwardly by a release member 68, which as shown in FIG. 6 is pivotally mounted at its base on a shaft 69 disposed near bent member 62e. A spring 70 urges the release member 68 to pivot clockwise about shaft 69. However, the pivotal movement is precluded by its free end portion 68a abutting against a stopper pin 71 attached to side wall 9a. If release lever 72 positioned on the exterior of the film holder 1, as shown in FIG. 1 and FIG. 2, is operated, then release member 68 pivots counter clockwise about shaft 69 against the biasing force of spring 70. Counter clockwise movement of member 68 results in its free end portion 68a pushing and moving downwardly bent member 62e so that locking lever 62 and locking arm 65 pivot clockwise about shaft 63 against the biasing forces of springs 64 and 66, respectively, thereby releasing pawls 62d and 65b from engagement with gears 32 and 28, respectively.

Figure 9:
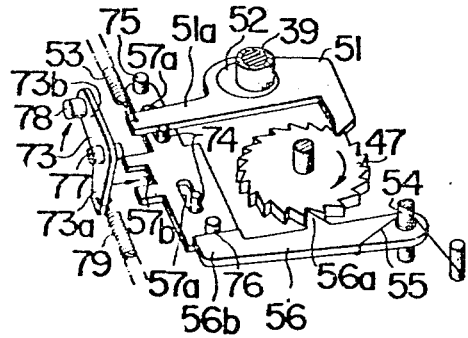
FIG. 9 is a perspective view of the operating means of FIG. 8.

Means for releasing feed pawl 51 and reverse rotation check pawl 56a from engagement with ratchet wheel 47 of the exposed film frame number counting mechanism comprises a slide plate 57 located adjacent to the ratchet wheel 47 and a bellcrank 73 causes slide plate 57 to move in a sliding motion, as shown in FIG. 8 and FIG. 9. Slide plate 57 has guide slots 57a, 57a which receive pins 74, 74, respectively, attached to side wall 9a so that plate 57 is slidable on side wall 9a. Pins 75 and 76 are formed on plate 57, and when the plate 57 moves in a sliding motion, pin 75 pushes and moves an arm extending from feed pawl 51 and the pin 76 pushes and moves free end portion 56b of arm 56 in which check pawl 56a is formed.

Formed in a side edge of an intermediate portion of slide plate 57 is a fork 57b which receives therein one arm 73a of bellcrank 73 which is pivotally supported on a shaft 77 connected to a portion of side wall 9a. The other arm 73b of the bellcrank 73 extends along the portion of wall 9a and a pin 78 is attached to its upper end which is adapted to be pushed and moved by a projection 10a, shown in FIG. 2, provided in cover 10 when the cover is fitted over film holder 9.

A spring 79 biases the bellcrank 73 to pivot counter clockwise about shaft 77 in FIG. 9 as shaft 77 is viewed from the left. Accordingly, when cover 10 is removed from film holder 9, bellcrank 73 pivots counter clockwise about shaft 77 and its arm 73a causes slide plate 57 to move along slots 57a, 57a, so that pins 75 and 76 push and move arm 51a and free end portion 56a of arm 56, respectively. This action releases the two pawls 51 and 56a from engagement with ratchet wheel 47.

If cover 10 is fitted over film holder 9, then pin 78 is pushed and moved by projection 10a and bellcrank 73 pivots clockwise about shaft 77 against the biasing force of spring 79, so that slide plate 57 moves in sliding motion in a direction where pins 75 and 76 attached thereto move away from arm 51a and free end portion 56a, respectively. This brings the two pawls 51 and 56a into engagement with ratchet wheel 47.

The arm 27 mounted on the shaft 25 is arranged to engage an edge of a cam 80 rotatably mounted on shaft 30 as shown in FIG. 8. Cam 80 is a partially cut-out disk, so that arm 27 moves in swinging motion as the cam 80 rotates. When arm 27 is moved counter clockwise in swinging motion about the central axis of shaft 25 by cam 80, shaft 25 also rotates counter clockwise. Thus, the arm 26 secured to shaft 25, as shown in FIG. 3, displaces flange 23a against the biasing force of spring 24, and moves the pressing plate 22 away from the film. Cam 80 is attached to and acts as a unit with gear 28, so that cam 80 rotates when gear 28 is rotated.

As shown in FIG. 4 and FIG. 5, a gear 81 is in meshed engagement with connection gear 7 which, in turn, is meshed with gear 28. The gear 81 is mounted on a sleeve 81a loosely fitted over a shaft 82, so that gear 81 is supported for rotation relative to shaft 82. A spiral spring 84 connected at one end to an immovable pin 83 is connected at the other end to sleeve 81a and urges gear 81 to rotate to a predetermined position at all times when the energy of resilience stored therein is released. This is effective to restore winding lever 5 and gears rotated by the operation of lever 5 to their original positions.

More specifically, when winding lever 5 is operated to advance the film, gear 28, ratchet wheel 29 and gear 81 rotate clockwise in FIG. 5 through the agency of connection gear 7, and clockwise rotation of these elements winds spiral spring 84 to store resilient energy. Upon release of winding lever 5, the resilient energy stored in spiral spring 84 is released and rotates gear 28, ratchet wheel 29 and lever 5 in the reverse direction through gears 81 and 7, and returns these elements to their initial or original positions.

Numerals representing exposed film frame number superposed on frame number indication dial 50, as shown in FIG. 6 and FIG. 7, are successively indicated in window 11a formed in cover 11.

The device for advancing film, as described above, operates in the following manner: when cover 10 is removed from film holder 9, note in FIG. 2, bellcrank 73 shown in FIG. 8 and FIG. 9 pivots about shaft 77 by the biasing force of spring 79 and slide plate 57 slides along guide slots 57a, 57a thereby causing pins 75 and 76 to release pins 75 and 76 from engagement with ratchet wheel 47. This permits ratchet wheel 47 to be rotated by the biasing force of a restoring spring (not shown) so as to indicate the start mark S of frame number indication dial 50 in window 11a. In this position, projection 49d of frame number indication dial 50 is brought into engagement with upwardly bent portion 62b of locking lever 62, however, since disks 48 and 49 are staggered relative to each other a distance corresponding to the width of the cutouts, bent member 62b is prevented from engaging in any one of the cutouts.

When the start mark S is indicated, take-up spool 21 is mounted between support pins 15 and 17 and supply spool 20 on which a roll film is mounted between support pins 14 and 16. A leading end portion of the film is extended between guide rollers 18 and 19 and its front end is wound on take-up spool 21.

Winding knob 36, snown in FIG. 2 mounted on the outside of film holder 1, is operated to advance the leading end portion of the film and wind the same on take-up spool 21. That is, if knob 36 is turned in the direction of the arrow, then gear 34 is rotated through gear 37 and rotates pin 17, thereby rotating take-up spool 21. Thus, the leading end portion of the film is wound on take-up spool 21. At this point in the operation, the gear 32 in meshed engagement with gear 35 rotates, but it does so idly. It is to be understood that the film contained in film holder is J120 type film having a backing sheet attached to it in the embodiment described.

Then, winding knob 36 is further turned to advance the leading end portion of the film till the start mark superposed on the backing sheet of the film is exposed to view through window 22a formed in pressing plate 22, and cover 10 is fitted over film holder 9. Upon mounting cover 10, the projection 10a of cover 10 pushes and moves pin 78 shown in FIG. 8 and causes bellcrank 73 to pivot against the biasing force of spring 79 and slide plate 57 to slide in a direction where pins 75 and 76 are moved away from arm 51a and free end portion 56b, respectively. This movement positions pawls 51 and 56a in engagement with ratchet wheel 47, so that subsequent advance of the film is indicated by the frame number indication dial 50.

Film holder 1 loaded with a roll of film in this way, is attached lighttight to the rear portion of the camera body 2 by means of lock lever 8 as shown in FIG. 1, and a light-intercepting plate (not shown) is removed from film holder 1. With the film holder 1 attached to the camera body 2, the connection gear 7 is in meshed engagement with gear 6 in the camera body 2 and thereafter the film can be advanced by operating the winding lever 5 on the camera body.

Then, several dry runs or movements of the film, i.e., about three frames, are made until the numeral 1 on frame number indication dial 50 appears in window 11a. More specifically, if winding lever 5 is turned slightly in the direction of the arrow in FIG. 1, then gear 28 is rotated through gears 6 and 7 and take-up spool 21 is rotated by means of the ratchet wheel 29, locking pawl 33 and gear 35, so that the film is advanced. Advancing the film results in rotation of guide roller 18 which in turn causes gear 40 to rotate through gear 38 secured to the shaft of roller 18, whereby pawl 51 begins to rotate the ratchet wheel 47. Rotation of ratchet wheel 47 causes disk 48, which is integral with ratchet wheel 47, to rotate. However, disk 49 disposed above disk 48 and connected theeto through spring 61, slots and pins remains stationary because the projection 46d thereof is maintained in engagement with upwardly bent member 62b of locking lever 62 and the two disks 48 and 49 are brought out of phase with each other.

If the cutouts formed in disks 48 and 49 are vertically aligned with one another, then bent member 62b is engaged in one set of cutouts 48a and 49a. When bent portion 62b is engaged in one set of cutouts 48a and 49a, locking lever 62 and locking arm 65 pivot counter clockwise about shaft 63 and bring pawls 62d and 65b into engagement with gears 32 and 28, respectively, thereby temporarily terminating film advance. This informs the operator that the film has been positively advanced. When this state is realized, one has only to operate release lever 72 to cause release member 68 shown in FIG. 6 to pivot counter clockwise about shaft 69 against the biasing force of spring 70.

When member 68 pivots it results in its free end portion 68a moving downwardly bent portion 62e of locking lever 62 outwardly, and the locking lever 62 pivots counter clockwise about sxaft 63 against the biasing force of spring 64. Clockwise pivoting of lever 62 results in the upwardly bent portion 62b being released from engagement in one set of cutouts 48a and 49a and at the same time results in the release of upwardly bent portion 62b from engagement with projection 49d. This allows upper disk 49 urged by the biasing force of spring 61 to move ahead of lower disk 48 a distance corresponding to the width of the cutouts, so that two disks 48 and 49 form a composite complete disk when viewed from above or below.

Further, clockwise pivoting of the locking lever 62 releases pawl 62d from engagement with gear 32, and pawl 65b is released from engagement with gear 28 when downwardly bent member 62e of lever 62 moves pin 67 outwardly. Even if the force exerted on release lever 72 is removed at this time, pawls 62d and 65b remains out of engagement with gears 32 and 28, respectively, because the upwardly bent portion 62b is maintained in engagement with the peripheries of two disks 48 and 49, thereby permitting gears 38 and 32 to rotate freely.

Accordingly, if winding lever 5 is continuously turned in the direction of the arrow shown in FIG. 1, then gear 28 is rotated through gears 6 and 7 and take-up spool 21 is rotated through ratchet wheel 29, locking pawl 33 and gear 35, and the film is advanced. Rotation of gear 28 results in the rotation of pin 46 integral with it, thereby releasing pin 46 from engagement with locking member 43 and leaving locking member 43 free to pivot counter clockwise about shaft 44 in FIG. 5 by virtue of the biasing force of spring 45.

However, when locking member 43 pivots counter clockwise, cutout 41a in the edge of disk 41 has moved from a position in which it is engaged by the pawl 43b of member 43 because disk 41 rotates in conjunction with film advance with gear 40 as a unit through the agency of gear 38. Thus, counter clockwise pivoting of locking member 43 merely results in its pawl 43b being brought into pressing engagement with the periphery of disk 41.

When the film is advanced in this way and disk 41 makes one complete revolution so that the cutout 41a is brought again to the position in which it is positioned against pawl 43b of member 43, pawl 43b is brought into engagement with cutout 41a, and the rotation of the disk 41 is stopped. If disk 41 stops rotating, then gears 40 and 38 also stop, so tha guide roller 18 stops rotating.

On the other hand, when pawl 43b is brought into engagement with cutout 41a, locking member 43 is urged by the biasing force of spring 45 to pivot counter clockwise about shaft 44, and pawl 43d at the end of the other arm 43c is brought into engagement with ratchet wheel 29, and the rotation of the ratchet wheel 29 is prevented. If ratchet wheel 29 stops rotating, then the gear 32, which rotates with ratchet wheel through the locking pawl 33, also stops rotating. Accordingly, the take-up spool 21 stops rotating, and the advance of the film a distance corresponding to one frame is completed. As the film is being advanced the distance of one frame, the pressing plate 22 is displaced out of the path of travel of the film by cam 80 which rotates, as a unit, with gear 28.

If disk 41 makes one complete revolution, then ratchet wheel 47 is moved a distance corresponding to one tooth thereof, and film frame number indication dial 50 rotates an amount corresponding to the advance of one frame of the film. This completes the operation of advancing the film by one frame. If the force exerted by hand on winding lever 5 is removed at this time, then winding lever 5, gears 81, 6, 7 and 28 and ratchet wheel 29 are rotated in the reverse direction as the resilient energy stored in restoring spring 84 is released, so that they return to their original positions. The rotation of gear 28 in the reverse direction brings pin 46 into engagement with the arm 43c of locking member 43 and pin 46 moves arm 43c, so that locking member 43 pivots clockwise about shaft 44 against the biasing force of spring 45, pawl 43b is released from engagement in cutout 41a and it stands ready for the next film advancing operation.

A few dry runs or movements of the film can be made in this way be depressing a shutter button B, shown in FIG. 1, provided camera body 2. Since the camera described in this embodiment is provided with self-cocking means, it is impossible to depress shutter button unless the film is advanced.

Accordingly, if the shutter button is depressed after the film is advanced and a few dry runs are made by repeating the operation of winding the film and depressing the shutter button two or three times, the numeral 1 of film frame number dial 50 will appear in window 11a and the camera will be ready to take a picture.

Accordingly, the film is advanced each time an exposure is made. When film frame indication dial 50 has rotated to a position in which the last frame of a J120 roll of film is to be exposed, the projection 49d of disk 49 is brought into engagement with the upwardly bent portion 62b of locking lever 62. If winding lever 5 is operated after the final exposure is made, the exposed film is advanced slightly and the lower disk 48 rotates slightly, so that the cutouts 48a to 48c of lower disk are brought into vertical alignment with the cutouts 49a to 49c of upper disk 49. When disks 48 and 49 are in this position, upwardly bent portion 62b is brought into engagement with a set of cutouts 48b and 49b, and pawls 62d and 65b are brought into engagement with gears 32 and 28 respectively. Thus, gears 32 and 28 stop rotating and film advance is precluded.

Thereafter, winding knob 36 is operated to advance the rest of the film and the trailing end portion. More specifically, release lever 72 is operated to release pawls 62d and 65b from engagement with gears 32 and 28 respectively through release member 69. Then, winding knob 36 is operated to rotate the take-up spool 21.

The embodiment has been shown and described using a roll of film of the J120 type. If a roll of film of the J220 type is used, one has only to operate release lever 72 when upwardly bent portion 62b is brought into engagement with a set of cutouts 48b and 49b so as to cause locking lever 62 and locking arm 65 to pivot counter clockwise about shaft 63 and bring bent portion 62b out of engagement with cutouts 48b and 49b and, at the same time, release pawls 62d and 65b from engagement with gears 32 and 28, respectively.

Disk 49 is angularly rotated by the biasing force of spring 61 when bent portion 62b is released from engagement with cutouts 48b and 49b, thereby bringing disks 48 and 49 to a position in which they contribute a composite complete disk as seen from above or below. Th s brings pawls 62d and 65b out of engagement with gears 32 and 28, respectively, and permits the film to advance each time exposure is made. After the last frame of the film is exposed, the projection 49d of disk 49 is brought into engagement with the upwardly bent portion 62b of locking lever 62. Thereafter, the film can be advanced in the manner as described with reference to the roll of J120 film.

While a specific embodiment of the invention has been shown and described in detail to illustrate the application of the inventive principles, it will be understood that the invention may be embodied otherwise without departing from such principles.

What is claimed is:

1. A device for advancing film in a camera from a film supply spool to a film take-up spool, comprising a film winding lever mounted on said camera, a first gear, first means arranged to be actuated by said winding lever and to rotate said first gear, a first shaft for supporting said first gear, a ratchet wheel positioned on said first shaft, second means for maintaining said ratchet wheel in frictional engagement with said first gear, a second gear, third means interposed between said ratchet wheel and said second gear for rotating said second gear in one direction only, a third gear in meshed engagement with said second gear, fourth means arranged to rotate said film take-up spool and disposed in operative engagement with said third gear, a second shaft and a guide roller positioned on said second shaft and arranged for guiding the film passing from said supply spool to said take-up spool, a third shaft, fifth means for rotating said third shaft from said second shaft, a disk having a cutout in its circumferential periphery secured to said second shaft, a locking member arranged to engage within the cutout in said disk after said disk has rotated through a predetermined angle and to stop the rotation of said ratchet wheel and interrupt the movement of the film, a feed pawl fitted into said third shaft, film frame number indication means including a dial arranged to be rotated by said feed pawl, a locking lever and a locking arm disposed in cooperating relationship for stopping the movement of said film frame number dial and of the film when said dial has advanced to a film frame count starting position, a pressing plate arranged to contact the film between said supply spool and said take-up spool when the film is stationary, a cam secured to said first shaft, means associated with said cam and said pressing plate for moving said pressing plate away from the film as the film is advanced from said supply spool to said take-up spool, said locking member is pivotally mounted between said disk and said ratchet wheel and comprises a pair of arms extending oppositely from the location at which said locking member is pivotally mounted, one of said arms having a pawl arranged to engage a cutout in said disk and the other said arm having an engaging pawl arranged to engage said ratchet wheel.

2. A device for advancing film in a camera from a film supply spool to a film take-up spool, comprising a film winding lever mounted on said camera, a first gear, first means arranged to be actuated by said winding lever and to rotate said first gear, a first shaft for supporting said first gear, a ratchet wheel positioned on said first shaft, second means for maintaining said ratchet wheel in frictional engagement with said first gear, a second gear, third means interposed between said ratchet wheel and said second gear for rotating said second gear in one direction only, a third gear in meshed engagement with said second gear, fourth means arranged to rotate said film take-up spool and disposed in operative engagement with said third gear, a second shaft and a guide roller positioned on said second shaft and arranged for guiding the film passing from said supply spool to said take-up spool, a third shaft, fifth means for rotating said third shaft from said second shaft, a disk having a cutout in its circumferential periphery secured to said second shaft, a locking member arranged to engage within the cutout in said disk after said disk has rotated through a predetermined angle and to stop the rotation of said ratchet wheel and interrupt the movement of the film, a feed pawl fitted into said third shaft, film frame number indication means including a dial arranged to be rotated by said feed pawl, a locking lever and a locking arm disposed in cooperating relationship for stopping the movement of said film frame number dial and of the film when said dial has advanced to a film frame count starting position, a pressing plate arranged to contact the film between said supply spool and said take-up spool when the film is stationary, a cam secured to said first shaft, means associated with said cam and said pressing plate for moving said pressing plate away from the film as the film is advanced from said supply spool to said take-up spool, said second means comprises a flange secured on said first shaft, and a spring extending between said flange and said ratchet wheel for biasing said ratchet wheel into frictional engagement with said first gear.

3. A device for advancing film in a camera from a film supply spool to a film take-up spool, comprising a film winding lever mounted on said camera, a first gear, first means arranged to be actuated by said winding lever and to rotate said first gear, a first shaft for supporting said first gear, a ratchet wheel positioned on said first shaft, second means for maintaining said ratchet wheel in frictional engagement with said first gear, a second gear, third means interposed between said ratchet wheel and said second gear for rotating said second gear in one direction only, a third gear in meshed engagment with said second gear, forth means arranged to rotate said film take-up spool and disposed in operative engagement with said third gear, a second shaft and a guide roller positioned on said second shaft and arranged for guiding the film passing from said supply spool to said take-up spool, a third shaft, fifth means for rotating said third shaft from said second shaft, a disk having a cutout in its circumferential periphery secured to said second shaft, a locking member arranged to engage within the cutout in said disk after said disk has rotated through a predetermined angle and to stop the rotation of said ratchet wheel and interrupt the movement of the film, a feed pawl fitted into said third shaft, film frame number indication means including a dial arranged to be rotated by said feed pawl, a locking lever and a locking arm disposed in cooperating relation ship for stopping the movement of said film frame number dial and of the film when said dial has advanced to a film frame count starting position, a pressing plate arranged to contact the film between said supply spool and said take-up spool when the film is stationary, a cam secured to said first shaft, means associated with said cam and said pressing plate for moving said pressing plate away from the film as the film is advanced from said supply spool to said take-up spool, said frame member indication means comprises a fifth shaft, a ratchet wheel rotatably mounted on said fifth shaft, a first disk-like member mounted on said fifth shaft and arranged to rotate with said ratchet wheel as a unit, a second disk-like member mounted on said fifth shaft and having the same diameter as said first disk-like member, and means interconnecting said first and second disk-like members and said dial being mounted on said fifth shaft.

4. A device for advancing film in a camera from a film supply spool to a film take-up spool, comprising a film winding lever mounted on said camera, a first gear, first means arranged to be actuated by said winding lever and to rotate said first gear, a first shaft for supporting said first gear, a ratchet wheel positioned on said first shaft, second means for maintaining said ratchet wheel in frictional engagement with said first gear, a second gear, third means interposed between said ratchet wheel and said second gear for rotating said second gear in one direction only, a third gear in meshed engagement with said second gear, fourth means arranged to rotate said film take-up spool and disposed in operative engagement with said third gear, a second shaft and a guide roller positioned on said second shaft and arranged for guiding the film passing from said supply spool to said take-up spool, a third shaft, fifth means for rotating said third shaft from said second shaft, a disk having a cutout in its circumferential periphery secured to said second shaft, a locking member arranged to engage within the cutout in said disk after said disk has rotated through a predetermined angle and to stop the rotation of said ratchet wheel and interrupt the movement of the film, a feed pawl fitted into said third shaft, film frame number indication means including a dial arranged to be rotated by said feed pawl, a locking lever and a locking arm disposed in cooperating relationship for stopping the movement of said film frame number dial and of the film when said dial has advanced to a film frame count starting position, a pressing plate arranged to contact the film between said supply spool and said take-up spool when the film is stationary, a cam secured to said first shaft, means associated with said cam and said pressing plate for moving said pressing plate away from the film as the film is advanced from said supply spool to said take-up spool, said means associated with said cam and said pressing plate comprising a sixth shaft, a first arm secured to said sixth shaft and extending into contact with said cam, and a second arm secured to said sixth shaft and spaced in the axial direction of said shaft from said first arm, a holding bar secured to said pressing plate, and a flange fixed to said holding bar and said second arm extending into contact with said flange for displacing said pressing plate.

* * * * *